E. M. Butz.
Corn-Planter.

Nº 74298. Patented Feb. 11, 1868.

Attest.
James J. Johnston.
A. C. Johnston.

Inventor. Edward M. Butz.

United States Patent Office.

EDWARD M. BUTZ, OF ALLEGHENY CITY, PENNSYLVANIA.

*Letters Patent No. 74,298, dated February 11, 1868.*

---

IMPROVEMENT IN CORN-PLANTERS.

---

*The Schedule referred to in these Letters Patent and making part of the same.*

---

TO ALL WHOM IT MAY CONCERN:

Be it known that I, EDWARD M. BUTZ, of the city and county of Allegheny, in the State of Pennsylvania, have invented a new and useful Improvement in Corn-Planters; and I do hereby declare that the following is a full and exact description thereof, reference being had to the accompanying drawings, and to the letters and figures of reference marked thereon.

The nature of my invention consists in so constructing a corn-planter that it will furrow out the ground for the reception of the seed, and deposit said seed at any desired intervals, and then cover said seed, said corn-planter being constructed and operating in the manner hereinafter described.

To enable others skilled in the art to make and use my invention, I will proceed to describe its construction and operation. In the accompanying drawings, which form part of my specification—

Figure 2:
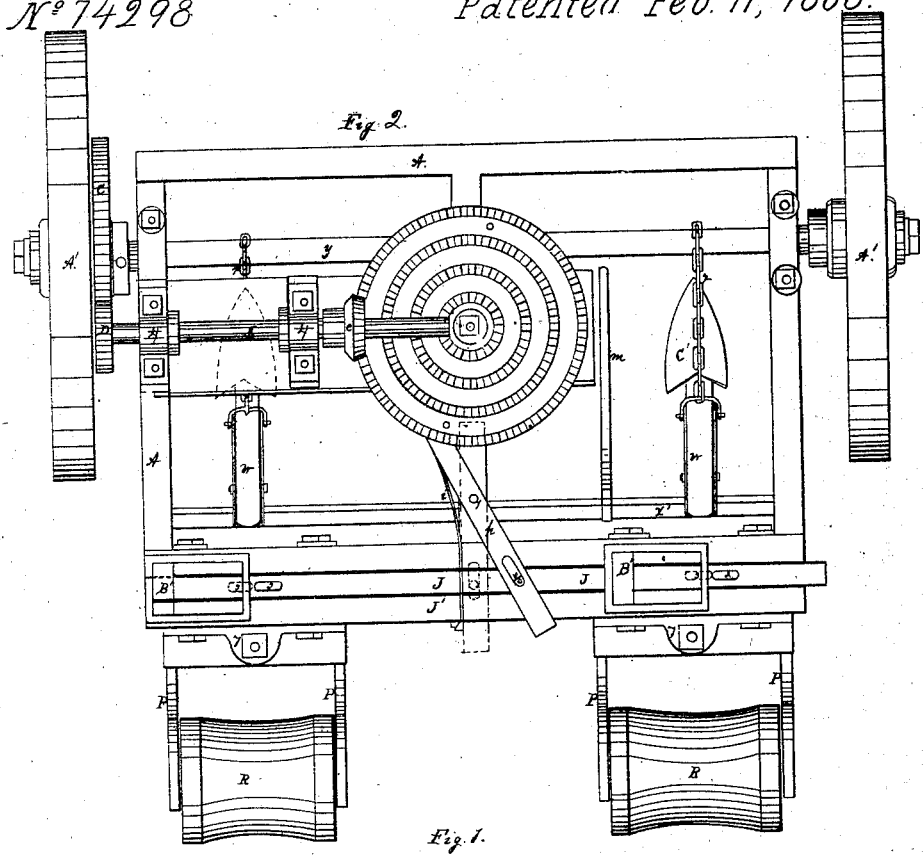
Figure 2 is a top view of the same.
Figure 1:
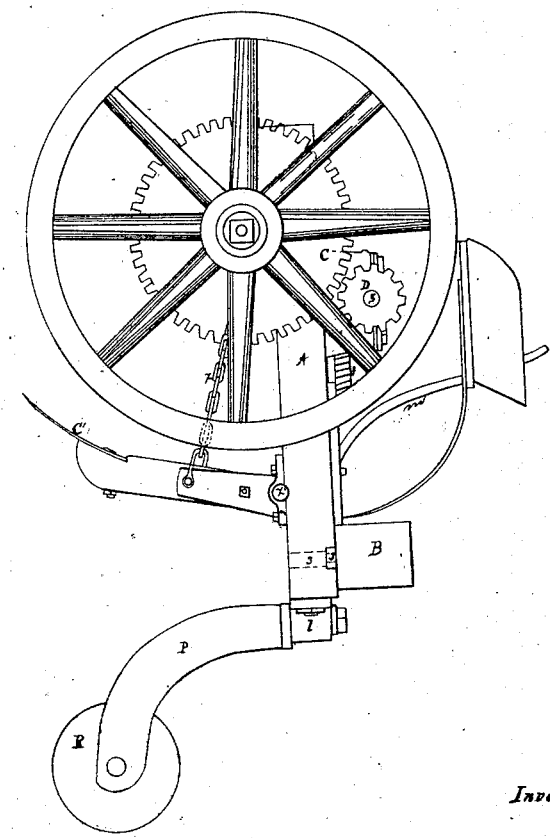
Figure 1 represents a side elevation of my improvements in corn-planters.

In the drawings, A represents the frame; A', the wheels, which revolve on the axle Y. To the hub of one of these wheels is attached a gear-wheel, C, which gears into a pinion, D, on the outer end of the shaft $g$, which is held in position by means of the bearings 4, which are secured to the frame A. On the shaft $g$, which extends over and to about the centre of the wheel $f$, is a small wheel, $e$, the teeth of which are so constructed and arranged that they will gear into the different series of teeth (marked 5, 6, 7, and 8) on the wheel $f$, which is pivoted to the frame A. The wheel $f$ is provided with two pins, marked 9, which are used, in connection with the spring $i$, for operating the lever $h$, which is pivoted to the frame A at the point marked 1, and to the feed-slide J at the point marked 0. The slide J is provided with seed-chambers 2, and is fitted in and moves in a groove made in the bar J' of the frame A. On bar J', and over the feed-slide J, are placed two hoppers, B', for holding the seed. To the shaft X', which is held in position by the bearings $n$, are attached two beams, $w$, which are provided with ploughs C', which can be elevated by lever $m$, and thereby making them inoperative when turning the planter at the ends of the rows, or when going to or returning from the field. To the back end of the frame of the planter, at the point marked $l$, are pivoted hangers P, in which are pivoted concave rollers R. The seat B, for the driver and operator, is supported on spring-bar S, the lower end of which is attached to the frame of the planter.

As the construction and arrangement of the several parts of my improved planter, and the relation that these several parts bear to each other, will readily be seen and understood by the skillful mechanic, by reference to the accompanying drawings, I will therefore, without further description of the construction, proceed to describe the operation of my improved planter, which is as follows:

The seed is placed in the hoppers B', the planter being drawn along in the direction that is intended for the rows of corn, and the revolving of wheels A' will revolve the wheel C, which will revolve the wheel D and shaft $g$, which will revolve the wheel $e$, which will revolve the wheel $f$, which will bring the pins 9 in contact with the ends of lever $h$, which will move it sideways, which will move the feed-slide J, which will, every time the pin 9 comes in contact with the lever $h$, deposit the seed, which drops from the seed-chamber 2 through openings 3, into the furrow made by the ploughs C', and rollers R will cover over and hill up the earth over the planted corn or other seed. The pins, 9, of the wheel $f$ moves the lever $h$ sideways, and the spring $i$ throws it back to its proper position.

It will readily be observed that the depth of the furrow can be regulated through the medium of the chains X, which are attached to the beams $w$ of the ploughs C'. The intervals for depositing the seed are regulated by changing the position of the wheel $e$ on the shaft $g$, so as to gear into the desired series of teeth on the upper face of the wheel $f$.

It will be readily observed that, if the wheel $e$ is geared into the teeth, 5, of the wheel $f$, the wheel $f$ will move much faster than when geared into the teeth, 8, and that the intervals between the deposits of seed will be much shorter when geared into the series of teeth marked 5, than when geared into the series of teeth marked 8. The wheel $f$ is provided with four series of teeth, which will, by changing the wheel $e$, to gear into these four different series of teeth, give four different intervals for depositing the seed.

Having thus described the nature, construction, and operation of my improvement, what I claim as my invention, is—

The combination of the wheels C, D, $e$, and $f$, when used in connection with the lever $h$, spring $i$, and slide J, the whole being constructed, arranged, combined, and operating as herein described, and for the purpose set forth.

EDWARD M. BUTZ.

Witnesses:
JAMES J. JOHNSTON,
ALEXANDER HAYS.